Patented Jan. 13, 1931

1,788,797

UNITED STATES PATENT OFFICE

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE

TRISAZO DYES AND PROCESS OF PREPARING THE SAME

No Drawing.   Application filed August 28, 1928.   Serial No. 302,645.

This invention relates to blue trisazo dyes for cotton and to the method of preparing the same. These dyes show a very good fastness to light and are prepared by diazotizing a 1-amino-8-naphthol-disulphonic acid having only one sulpho group in each nucleus, coupling the diazo compound to an amino compound having a free para-position and not containing a free hydroxyl-, sulpho- or second amino group, diazotizing the aminoazo compound, coupling it to 2-amino-5-naphthol-7-sulphonic acid, then diazotizing this disazo dye and coupling it to a coupling component of the naphthalene series having at least one hydroxy group. The acid dyes have probably the following general formula:

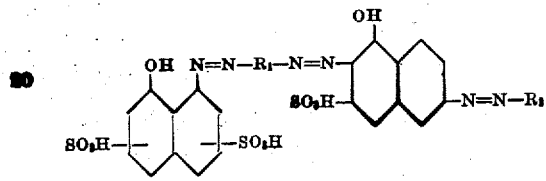

$R_1$ being an aromatic radical not containing a free hydroxyl-, sulpho- or amino-group and $R_2$ being a coupling component of the naphthalene series having at least one hydroxyl group.

The new dye compounds and their preparation are disclosed in the following examples of actual embodiments of the process. It is to be understood that these examples are furnished by way of illustration only, and that the details of the procedure specified therein, as well as the particular proportions, reagents, temperatures, etc., are susceptible of variation and substitution.

*Example 1.*—341 parts of 1-amino-8-naphthol-3:6-disulphonic acid (H-acid) are diazotized in the usual way and to the diazo there is added a solution of 144 parts alpha-naphthylamine in 2500 parts of water and 150 parts of a 31% hydrochloric acid solution dissolved at 85–90° C. The coupling temperature is kept at 15–20° C., the mineral acid reaction being neutralized with sodium acetate. The coupling will be complete within about one hour. It is then made alkaline with sodium hydroxide, acidified again with hydrochloric acid and diazotized at 0–5° C. with a solution of 69 parts of sodium nitrite. The diazotization will be complete in ten minutes and is then coupled with a solution of 239 parts of 2-amino-5-naphthol-7-sulphonic acid at 0–5° C. containing sufficient sodium carbonate to maintain a strong alkaline reaction during the coupling. The bluish-violet dye is salted out and filtered. The paste is stirred up with 4000 parts of water, cooled to 10° C., acidified with 350 parts of a 31% hydrochloric acid solution and diazotized with a solution of 69 parts of sodium nitrate. The diazotization will be complete within one-half hour. It is then coupled to a solution of 224 parts of 1-naphthol-4-sulphonic acid containing 500 parts of sodium carbonate at a temperature of 0–5° C. This final coupling is heated to 80° C. and salted out. The new dye is soluble in water with a bright blue coloration and dye cotton and other vegetable fibers in bright reddish-blue shades which show an excellent fastness to light. The acid dye probably has the following formula.

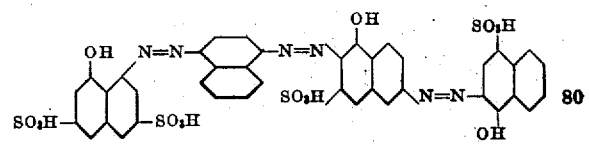

*Example 2.*—Replacing in Example 1 the last component (1-naphthol-4-sulphonic acid) by 341 parts of 1-amino-8-naphthol-3:6-disulphonic acid, leaving all the other conditions the same, a dye will be obtained which is soluble in water with a very bright greenish-blue coloration, dyeing cotton in bright greenish-blue shades of excellent fastness to light. The acid dye probably has the following formula:

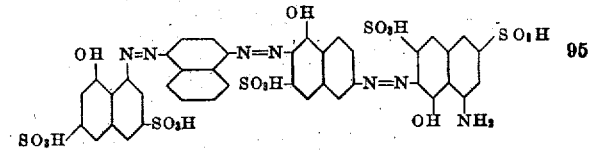

*Example 3.*—Substituting, Example 2, the second component (alpha-naphthylamine) by 137 parts of cresidine

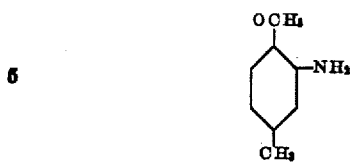

leaving all other conditions the same, a dye is obtained the shade of which is very slightly redder than the one of Example 2, but having the same properties. The acid dye probably has the following formula:

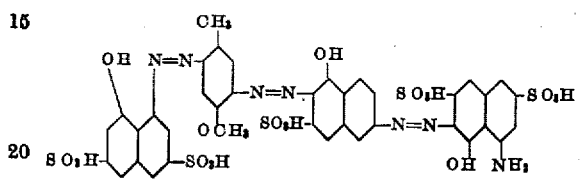

For the first component other peri-amino-naphthol-disulphonic acids can be used, as 1:8:4:6, 1:8:3:5-amino-naphthol-disulphonic acids. As second components other amino compounds can be used as m-toluidine, p-xylidine, and others. As last components other coupling components of the naphthalene series may be used, as 2:6, 2:7 and 1:5-naphthol-sulphonic acids, alpha- and beta-naphthol-disulphonic acids, dioxy-naphthalene-mono- and disulphonic acids and amino-naphthol-mono- and disulphonic acids.

In spite of the fact that trisazo dyes containing a hydroxyl group in a middle component are generally of a dull shade and of inferior fastness to light as compared to trisazo dyes without a hydroxyl group in any of the middle components, the dyes of the present invention have been found to be of unusual brightness and fastness to light.

It will be obvious that by varying the reagents employed a large number of dyes may be made within the scope of the appended claims. These dyes are all characterized by an unusual affinity for textiles, especially cotton, and an excellent fastness to light.

I claim:

1. A dye compound having the general formula:

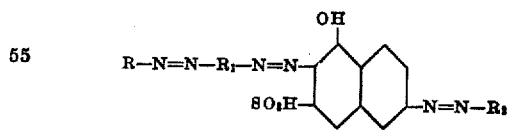

where R represents a residue of a 1-amino-8-naphthol-disulphonic acid having only one sulpho group in each nucleus, $R_1$ represents an aromatic radical not containing a free group of the class consisting of hydroxyl, sulpho and amino groups, and $R_2$ represents a radical of a coupling component of the naphthalene series having at least one hydroxyl group.

2. A dye compound having the general formula:

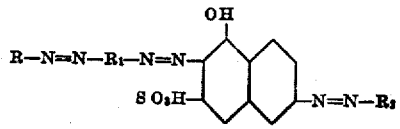

where R represents a residue of a compound of the class consisting of 1:8:3:6, 1:8:4:6 and 1:8:3:5-amino-naphthol-disulphonic acids, $R_1$ represents a radical of a compound of the class consisting of alpha-naphthylamine, m-toluidine, p-xylidine, and $R_2$ represents a radical of a compound of the class consisting of 1:4, 2:6, 2:7 and 1:5-naphthol-sulphonic acids, alpha and beta naphthol disulphonic acids, dioxy-naphthalene-mono- and disulphonic acids and amino-naphthol- and disulphonic acids.

3. The dye compound set forth in claim 1 wherein R represents a residue of 1-amino-8-naphthol-3:6-disulphonic acid.

4. The dye compound set forth in claim 1 wherein $R_1$ represents a residue of alpha naphthylamine.

5. A dye compound set forth in claim 1 wherein $R_2$ represents a naphthol-sulphonic acid radical.

6. A dye compound set forth in claim 1 wherein $R_2$ represents an amino-naphthol-disulphonic acid radical.

7. A dye compound having the formula:

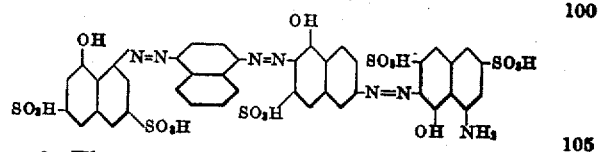

8. The process of preparing a trisazo dye which comprises diazotizing a 1-amino-8-naphthol-disulphonic acid having only one sulpho group in each nucleus, coupling the diazo compound to a mono-amino compound having a free para position and not containing a free group of the class consisting of hydroxyl and sulpho groups, diazotizing the amino-azo compound, coupling it to 2-amino-5-naphthol-7-sulphonic acid, diazotizing the resulting disazo compound and coupling to a compound of the naphthalene series having at least one hydroxyl group.

9. The process of preparing a trisazo dye which comprises diazotizing 1-amino-8-naphthol-3:6-disulphonic acid, coupling the diazo compound to alpha-naphthylamine, diazotizing the amino-azo compound, coupling it to 2-amino-5-naphthol-7-sulphonic acid, diazotizing the resulting disazo compound and coupling it to a naphthol-sulphonic acid.

10. The process of preparing a trisazo dye which comprises diazotizing 1-amino-8-naphthol-3:6-disulphonic acid, coupling the diazo compound to alpha-naphthylamine, diazotizing the amino-azo compound, coupling it to 2-amino-5-naphthol-7-sulphonic acid, diazotizing the resulting disazo compound and coupling it to an amino-naphthol-disulphonic acid.

11. The process of preparing a trisazo dye which comprises diazotizing 1-amino-8-naphthol-3:6-disulphonic acid, coupling the diazo compound to alpha-naphthylamine, diazotizing the amino-azo compound, coupling it to 2-amino-5-naphthol-7-sulphonic acid, diazotizing the resulting disazo compound and coupling it to 1:8-amino-naphthol-3:6-disulphonic acid.

12. Textile fabric dyed with the compound set forth in claim 1.

In testimony whereof, I affix my signature.

HENRY JORDAN.

ing the amino-azo compound, coupling it to 2-amino-5-naphthol-7-sulphonic acid, diazotizing the resulting disazo compound and coupling it to an amino-naphthol-disulphonic acid.

11. The process of preparing a trisazo dye which comprises diazotizing 1-amino-8-naphthol-3:6-disulphonic acid, coupling the diazo compound to alpha-naphthylamine, diazotizing the amino-azo compound, coupling it to 2-amino-5-naphthol-7-sulphonic acid, diazotizing the resulting disazo compound and coupling it to 1:8-amino-naphthol-3:6-disulphonic acid.

12. Textile fabric dyed with the compound set forth in claim 1.

In testimony whereof, I affix my signature.

HENRY JORDAN.

CERTIFICATE OF CORRECTION.

Patent No. 1,788,797.  Granted January 13, 1931, to

HENRY JORDAN.

It is hereby certified that error appears in the printed specification of the above numbered patent requiring correction as follows: Page 1, line 15, for the word "hydroxy" read hydroxyl; line 64, for the word "nitrate" read nitrite, and line 71, for the word "dye" read dyes; and that the said Letters Patent should be read with these corrections therein that the same may conform to the record of the case in the Patent Office.

Signed and sealed this 10th day of February, A. D. 1931.

(Seal)

M. J. Moore,
Acting Commissioner of Patents.

CERTIFICATE OF CORRECTION.

Patent No. 1,788,797.  Granted January 13, 1931, to

HENRY JORDAN.

It is hereby certified that error appears in the printed specification of the above numbered patent requiring correction as follows: Page 1, line 15, for the word "hydroxy" read hydroxyl; line 64, for the word "nitrate" read nitrite, and line 71, for the word "dye" read dyes; and that the said Letters Patent should be read with these corrections therein that the same may conform to the record of the case in the Patent Office.

Signed and sealed this 10th day of February, A. D. 1931.

M. J. Moore,
(Seal) Acting Commissioner of Patents.